R. A. FORBES.
COMPUTING SCALE.
APPLICATION FILED SEPT. 21, 1909.
962,332.
Patented June 21, 1910.
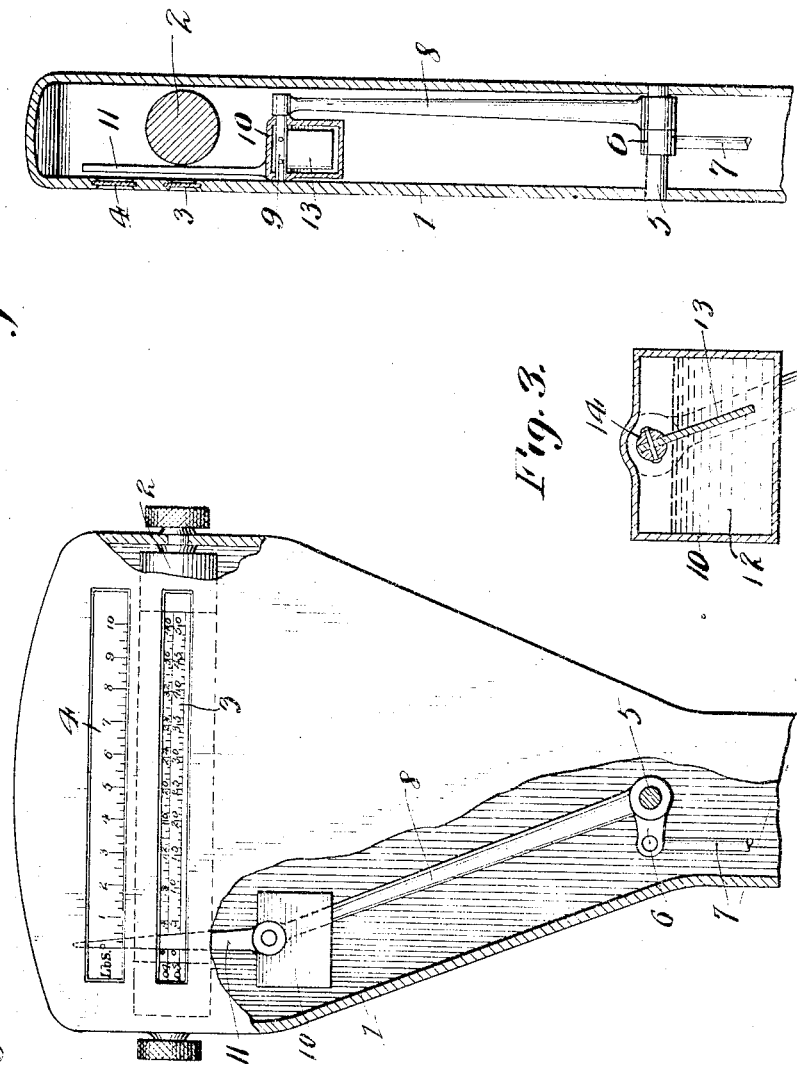
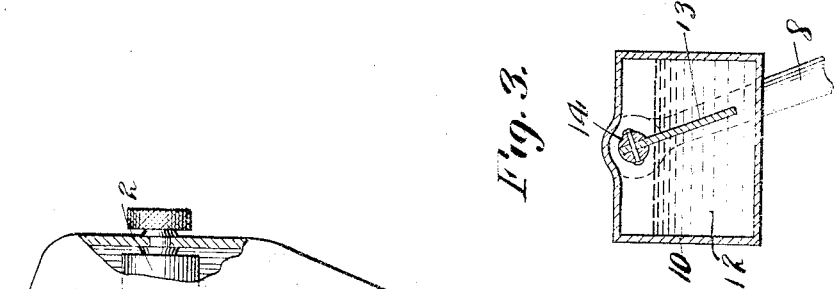
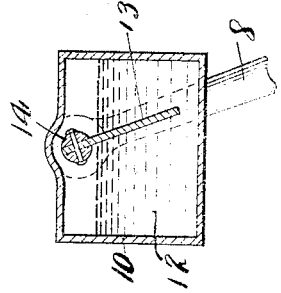
Inventor
Robert A. Forbes.
Witnesses
William C. Linton.
C. C. Hines.
By Victor J. Evans
Attorney

UNITED STATES PATENT OFFICE.

ROBERT A. FORBES, OF ANDERSON, INDIANA.

COMPUTING-SCALE.

962,332.

Specification of Letters Patent.

Patented June 21, 1910.

Application filed September 21, 1909. Serial No. 518,755.

*To all whom it may concern:*

Be it known that I, ROBERT A. FORBES, a citizen of the United States, residing at Anderson, in the county of Madison and State of Indiana, have invented new and useful Improvements in Computing-Scales, of which the following is a specification.

This invention relates to computing scales of that type in which the hand or pointer is pivotally mounted upon an indicator arm movable in an arcuate path, the object of the invention being to provide simple and effective means for maintaining the pointer in a perpendicular position at all points in its path of movement and at the same time preventing oscillation or vibration thereof when it reaches indicating position.

The invention consists of the features of construction, combination and arrangement of parts hereinafter fully described and claimed, reference being had to the accompanying drawings, in which:—

Figure 1 is a front view of the indicating portion of a computing scale embodying my invention, the casing being partially broken away to show the interior construction. Fig. 2 is a vertical front to rear section through the same. Fig. 3 is a transverse section through the pointer support.

Referring to the drawing, 1 designates casing or housing of the indicating mechanism of the scale, within which is arranged a computing drum or scale 2, the figures upon which are adapted to be disclosed for observation through a transparent panel 3 in the front wall of the casing. Above the panel 3 the casing is also provided with a transparent panel 4 bearing a value-in-pounds scale.

Arranged within the lower portion of the casing is a rock shaft 5 provided with a crank arm 6 which is connected by a rod 7 with the weighing mechanism of the scale, not shown, whereby motion is transmitted to said shaft. The shaft is also provided with an indicator arm 8 extending upwardly within the casing and movable in an arc from side to side thereof below the computing drum 2.

Arranged at the upper end of the arm 8 is a right angularly extending forwardly projecting pivot pin or trunnion 9 on which is mounted an oscillatory support 10 which carries the indicator hand or pointer 11, which pointer extends upwardly in rear of the panels 3 and 4 and between the panel 3 and drum 2 and is designed to move across the casing and longitudinally of the price-per-pound scale to coöperate with the figures thereon.

The support 10 is hollow, preferably comprising a box or receptacle containing a body 12 of water or other suitable fluid, operated by gravity to maintain the support in a horizontal position as the arm 8 swings, so that the pointer 11 will be held in a perpendicular position to accurately register with the numerals or graduations of the price-per-pound scale irrespective of the angular position of the indicator arm at any point in its path of movement.

In order to prevent vibration or oscillation of the pointer on its pivotal support, a blade, vane, wing or plane 13 is arranged between the box 10 and depends into the body of water or fluid 12, said blade being preferably inserted at its upper end within a groove or slot in the pivot pin 9 and secured thereto by rivets or other suitable fastenings 14. This blade is therefore fixed to move with the indicator arm 8 and acts in conjunction with the body of fluid 10 to oppose a resistance to any sudden or too violent movement of the box or pointer, thus adapting them to swing gradually on the pivot pin and to a sufficient extent only to maintain a perpendicular position of the pointer. The body of water also acting on the vane opposes a resistance to prevent oscillation of the box and pointer on the rivet when the indicator arm comes to a stop.

From the foregoing description, the construction, mode of use and advantages of my improved indicator will be readily understood, and it will be seen that the fluid and vane operate as a dash pot to control the movements of the pointer, thus securing accuracy in registration and avoiding the uncertainties liable to be produced when the pointer oscillates on its pivot. The same principle of construction may be employed in scales of any character using the same general combination of elements.

I claim:—

1. In an indicator, an indicator arm movable in an arcuate path, a hollow support pivotally mounted upon said arm, a pointer carried by the support, a fluid pressure controlled means contained within the support for limiting the oscillatory movement thereof.

2. In an indicator, an indicator arm movable in an arcuate path, a hollow support pivotally mounted thereon, a pointer carried by said support, a body of fluid within the support, and means carried by the arm and coöperating with said body of fluid to limit the oscillatory movement of said support.

3. In an indicator, an indicator arm movable in an arcuate path, a hollow support pivotally mounted thereon, a pointer carried by said support, a body of fluid within the support, and a vane or wing upon the arm partially submerged in said fluid and coöperating therewith to limit the oscillatory movement of the support.

4. In an indicator, an indicator arm movable in an arcuate path, a pivot pin projecting laterally from said arm, a hollow support pivotally mounted upon said pin, a pointer carried by said support, a body of fluid within the support and a vane or wing secured to the pivot pin and projecting into said column of fluid for coöperation therewith to limit the oscillatory movement of said support.

In testimony whereof I affix my signature in presence of two witnesses.

ROBERT A. FORBES.

Witnesses:
D. C. CHIPMAN,
JULIA A. MOORE.